Aug. 18, 1942.  E. FERLITO  2,293,537
METHOD OF PRODUCING TEMPERED GLASS SHEETS
Filed Nov. 1, 1938  2 Sheets-Sheet 2

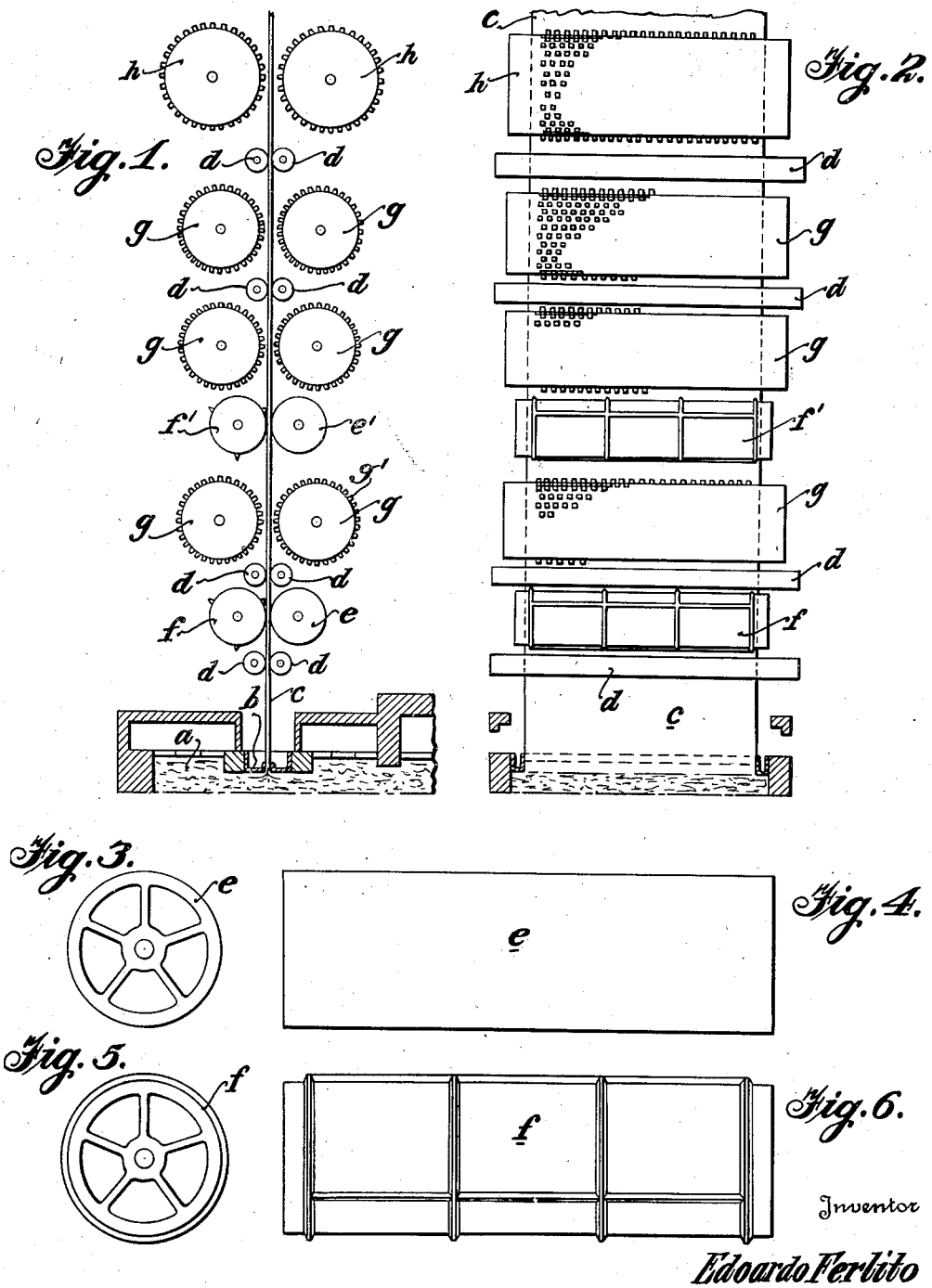

Inventor
*Edoardo Ferlito*
By *Stevens and Davis*
Attorneys

Patented Aug. 18, 1942

2,293,537

UNITED STATES PATENT OFFICE 2,293,537

METHOD OF PRODUCING TEMPERED GLASS SHEETS

Edoardo Ferlito, Milan, Italy

Application November 1, 1938, Serial No. 238,158
In Italy December 24, 1937

5 Claims. (Cl. 49—79)

The present patent application has for its object improvements in the production in series of sheets of tempered glass according to the method already indicated in application Serial No. 180,084 filed December 16, 1937 (now patent 2,237,982, issued April 8, 1941), by the same applicant, in which a method of tempering is disclosed which provides for the separation from the body of the tempered sheet of a portion or a zone thereof.

The particular object of the present invention now is to provide an improved method which makes possible a production in extensive series and which results in a reduction of the cost of the sheets, while leaving the existing plants substantially as they are, and limiting the production of various sizes, not in series. The invention concerns, precisely, improvements tending to adapt the existing horizontal and vertical machines to the production, in a continuous manner, of sheets of glass or of crystal by providing suitable tempering arrangements.

Methods are well known that are based on the abstract principle of the formation of tempered glass during the rolling of same by vertical systems. These methods, however, make no provision for cutting the glass into several parts after the tempering thereof, or else mechanical means are resorted to such as are totally unadapted to a production in series.

It would not be advisable to heat the glass during the course of the manufacturing process simply to have to cool it subsequently and then re-heat it later for the tempering process.

According to the aforesaid patent application and as indicated in the present specification, the invention contemplates the formation of grooves upon one or both sides of one and the same sheet during the tempering process. These grooves have minimum tensions (due to the limited thickness of same) or have at least different tensions from the rest of the sheet. In this manner the sheets may be cut, after tempering, into several pieces, out of the large tempered sheet, along the aforesaid grooves which serve as cutting or detachment lines.

The present invention is applicable to horizontal as well as to vertical sheet glass producing machines. These machines are characterized by a plurality of rollers having special projections or recesses, or blades or punch-dies shaped to conform exactly to the pattern, which must be etched on the heated sheet as soon as same has left the tank and during the formation thereof, which patterns correspond to the size and shape of the finished glass sheets and therefore constitute cutting lines. The apparatus for the rolling out of the glass both horizontally and vertically is provided with stamping means that follow said sheet in its ascending or horizontal course at a speed corresponding to that of the glass strip and suitably accelerated relatively to the work actually in hand. In combination with these machines, means are provided for the sudden cooling by jets of air or other fluid, or through an opportune aspiration of the hot air. These cooling means, such as caissons, perforated pipes, nozzles and so forth, may be fixed or movable, according to the thickness of the sheet and to the speed of travel of the glass strip, and may blow air uninterruptedly or at intervals. They may also be arranged so as to cool both sides of the sheet.

The large strip-shaped sheet emerging from the tank will be impressed by rollers, blades, wheels or dies, situated at a proper height relatively to the tank. These rollers, etc., are constructed to produce a series of preordinate grooves, simple or crossed or of any description, on said glass sheet, which grooves will form the lines for subsequent separation. After that, tempering will take place.

It will be understood that the grooves or indentations may also be made in sheets by casting or similar methods.

The improvements will be more precisely understood from the annexed specification, and the accompanying drawings which illustrate by way of example how the invention may be carried out.

In these drawings:

Fig. 1 is a schematic side view of a vertical glass producing apparatus;

Fig. 2 shows a front view of the apparatus shown in Fig. 1;

Fig. 3 is a schematic side view of a press-cylinder, and

Fig. 4 is a front view thereof;

Fig. 5 is a side view of a cylinder provided with raised portions, and

Fig. 6 shows said cylinder in a front elevation;

Figure 7:
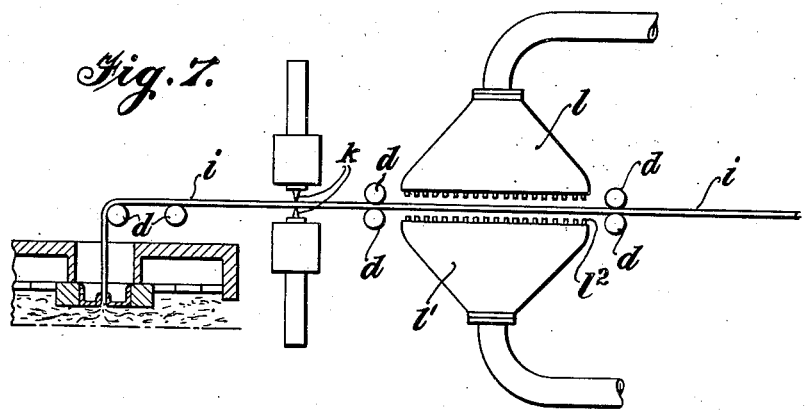
Fig. 7 is a schematic side view of a device to be applied to a furnace of the Libbey Owens type in which cutting grooves are produced upon a horizontal sheet.

Referring in greater detail to the drawings, the sheet of glass $c$ rises from the tank $a$ of a conventional furnace through a special (floating) stock $b$. This sheet is of a pasty consistency and has a width and length corresponding to the passage through the said float $b$.

For a certain distance—to be estimated by the expert in each particular case—the glass strip is guided by two rollers $d$—$d$. Immediately after the said rollers, the sheet is gripped by two other large rollers $e$—$f$ of which that marked $e$ in the example is a press roller such as that indicated in Figs. 3 and 4; that marked $f$ instead, being a roller provided with raised portions as indicated in Figs. 5 and 6.

The roller $f$, as illustrated, includes linear raised portions for producing quadrangular sheets, but it will be plain that the said raised portions may be of any other shape. It is advisable to heat these raised portions or points for the purpose of permitting the formation of the grooves as required.

Two guide rollers $d$—$d$ follow the rollers $e$, $f$ and then the ascending sheet proceeds between two special large air-blowing rollers $g$—$g$. These rollers are provided therefor with a certain number of nozzles, slots or passages $g'$ through which is violently blown the cold air introduced into said rollers by means of ventilators (not shown in the drawings). These nozzles or passages are provided with regulatable closing means, so as not to blow any unnecessary air, and especially, not to blow any against the lower part of the sheet during the grooving process, viz. not to blow it against points at which the glass is to remain heated and of a pasty consistency.

The sheet thus is subjected to an initial tempering, and on continuing to rise it encounters two other rollers $e^1$—$f^1$ similar to those marked $e$—$f$, already described. These two rollers $e^1$—$f^1$ are located at such a distance from the ascending glass strip, that the raised portions of the roller $f^1$ fit exactly into the grooves previously cut by the roller $f$.

Immediately after, these two rollers $e^1$—$f^1$, the ascending strip encounters two other blow-rollers $g$—$g$ like those already described, then, two further guide-rollers $d$—$d$, and afterwards, two more blow-rollers $g$—$g$ and lastly, two large air-aspirating rollers $h$—$h$, having the same power as those marked $g$, but which, instead of blowing, aspirate the heat remaining on the sheet $c$.

Although Figs. 1 and 2 show rollers $f$—$f^1$ only as carrying raised portions to fit the grooves in the sheet, it will be understood that the rollers $e$ and $e^1$ may be similar to those marked $f$—$f^1$, that is, they may also be provided with raised portions. In the latter case however, the raised portions of the said cylinders or rollers must with one another coincide and the two cylinders must rotate at the same speed, so that corresponding indentations are produced on the ascending glass strip on both sides in registering relationship.

The means for rotating the blowing cylinders is arranged so that the speed of rotation of successive cylinders will increase progressively with respect to their order of engagement with the glass sheet.

If necessary, the guide-rollers $d$ disposed along the strip above the first rollers $e$—$f$ may also be omitted.

Thus, a continuous glass strip is obtained, which becomes tempered as the aforementioned cycle is completed and provided with various lines or indentations, within which indentations or grooves the tensions are at a minimum relatively to the tensions in the rest of the sheet, in any event the tension in the grooves is less than in the rest of the sheet. Thus, the said tempered glass sheet may, after completion of the tempering operation, be divided into a number of sheets or portions, determined by the grooves produced upon the aforesaid glass sheet. The severing may be accomplished by any well-known means and the severed edges may be polished in the usual manner.

The example according to Fig. 7 shows, as already stated, a method that may be applied immediately after the treatment in a furnace of the Libbey Owens type. In this latter case, the horizontally moving strip is grooved with cutting points or the like, spaced a certain distance apart, to enable the separation of the several sheets delineated.

Referring to Fig. 7 the strip $i$ of incandescent glass, guided by the guide-rollers $d$—$d$, passes between two cutting points $k$—$k$ disposed above and below the strip, which points are caused to advance at predetermined intervals by any kind of means, for instance compressed air, hydraulic means, adjusting screws, or other mechanical means, which do not form part of the instant invention. The strip guided by the rollers $d$—$d$ then passes between two caissons $l$—$l^1$. The caissons are provided on the side registering with the traveling strip, with nozzles $l^2$, whence the air introduced under pressure by special ventilators, strikes against said strip. Instead of nozzles, air-holes or passages may be provided. The underlying caisson $l^1$, of a shape and size similar to that marked $l$, but instead of blowing air, may aspirate the heated air from off the glass sheet undergoing tempering.

Two successive pairs of rollers $d$—$d$ guide the strip.

Figure 8:
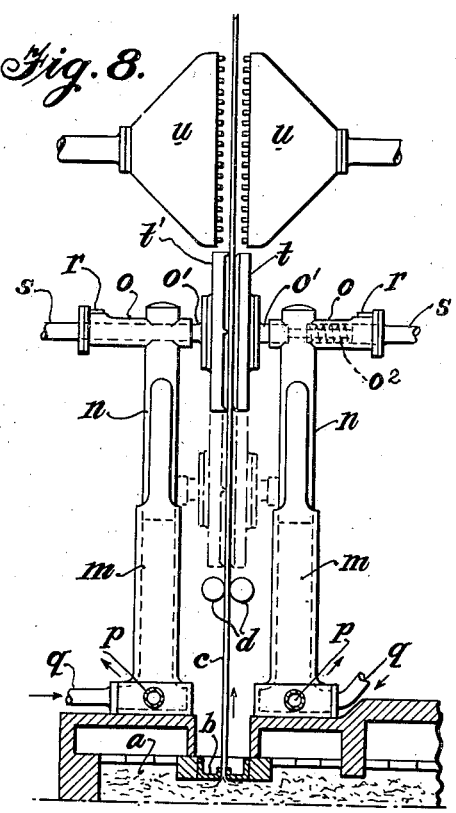
Fig. 8 is a schematic side view of a modification.
Figure 9:
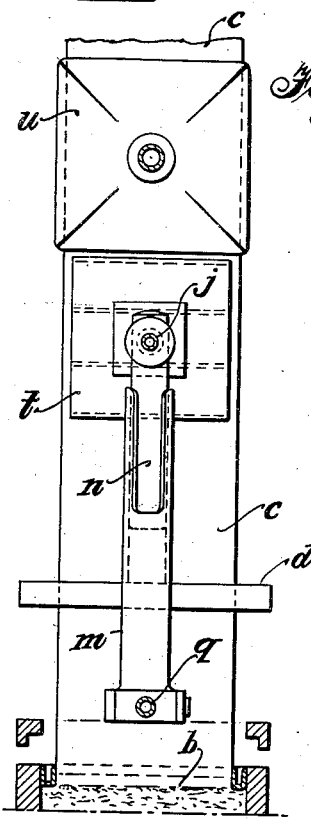
Fig. 9 is a front view of the device shown in Fig. 8.

The example indicated in Fig. 8 may be applied to furnaces producing vertical glass strips. In this example, no engraving rollers are employed, but instead dies, carrying, in relief, the outlines of the glass sheet desired to be produced. These dies accompany the strip for a certain distance. Upon their disengagement with the strip they re-descend in order to again engage a succeeding zone of glass strip.

The apparatus may be actuated by compressed air, or by a hydraulic system, or by any other suitable actuating force.

In the example shown, there are located on either side of the glass strip $c$ emerging from the furnace tank, and upon the furnace itself, two hollow columns or pillars $m$—$m$ within which operate two pistons $n$—$n$. At the top of the said pistons are located two cylinders $o$—$o$ within each of which operates a piston $o'$ to one end of which the dies $t$—$t^1$ are affixed.

At the base of the columns $m$—$m$ are situated two escape conduits $p$—$p$ and two admission conduits $q$—$q$.

In the upper cylinders $o$—$o$ there are two conduits $r$—$r$ one on either side—and two admission conduits $s$—$s$.

The lower conduits $p$—$p$ are controlled in synchronism with the cutting off of the air or of the water admitted into the columns $m$—$m$. The same may be said as regards the upper conduits $r-r$ which are also controlled in synchronism with the cutting off of water or air from the cylinders $o-o$.

This control is not indicated in the drawings but is obviously obtainable by any mechanical means.

The dies $t-t^1$ connected to the pistons $o^1$ carry, on the face bearing against the glass strip, raised portions following curved, straight or other lines for obtaining glass sheets of the desired shape. In the example, the die $t^1$ carries horizontal lines in relief, while the die $t$ carries vertical lines in relief. In this manner the strip is grooved on both sides for quadrangular sheets.

The operation of this arrangement is as follows: The strip $c$ emerging from the furnace tank, guided by the rollers $d-d$ is engaged on either side by the two dies $t-t^1$ actuated by compressed air or water through the conduits $s-s$. At this stage of the operation the pistons $n-n$ have reentered the columns $m-m$ and the dies have assumed the position indicated by the dot-and-dash lines in the drawings.

The air or the water presses the dies $t-t^1$ against the rising strip. As soon as the two dies press firmly against the sheet, air or water is immediately admitted into the conduits $q-q$. The pistons $n-n$ will then ascend with the strip $c$ and push the dies along with them until a distance corresponding to the size of the dies has been traversed. The admission of air or water is then cut off from the conduits $s-s$, the conduits $r-r$ being opened at the same time, whence the air or the water contained in the cylinders $o-o$ is evacuated. The return movement of the dies may be accelerated by special springs $o^2$ contained within the said cylinders $o$.

The pistons $n-n$ descend, by their own weight, and the dies return to the dot-and-dash line position.

This operation is repeated indefinitely.

Meanwhile, the rising sheet, as soon as it is disengaged from the dies, passes between the two caissons $u-u$ which—like those previously described—blow cold air against the sheet, tempering same, and so on.

As previously indicated, selected movement may be imparted to the air streams emanating from the caissons $u-u$ so as to prevent the occurrence of irridescence.

Figure 10:
Fig. 10 is an end view of a modified form of the invention involving the use of a casting grate for providing grooves in the molten glass sheet prior to tempering, the glass being shown in position in the mold.

Referring now to Figure 10, the invention may also be carried out by placing the vitreous casting $z$ on a mold $x$ embodying the desired design. The registering intersecting lines in the sheet may be applied to the casting by a roller $y$ embodying a design $v$ similar to that of the mold. After the intersecting lines have been formed in the vitreous casting, the latter may be cooled in the manner previously described.

What I claim is:

1. A process for the production of sheets of tempered glass from molten glass comprising, forming molten glass into a sheet of substantially uniform thickness, forming while the sheet is still in a soft condition at least one continuous groove in the sheet extending thereacross substantially from edge to edge thereof, subjecting all portions of said sheet to a cooling blast immediately after the formation of said groove, and severing the sheet along the groove after chilling.

2. A continuous process for the production of sheets of tempered glass from molten glass comprising, continuously forming molten glass into a sheet of substantially uniform thickness, forming while the sheet is still in a soft condition intersecting grooves in succeeding portions of said sheet, at least one of the grooves being continuous and extending thereacross substantially from edge to edge thereof, continuously subjecting successive portions of said sheet to a cooling blast immediately after the formation of the grooves, and severing the sheet along the grooves after chilling.

3. A continuous process for the production of sheets of tempered glass from molten glass comprising, continuously forming molten glass into a sheet of substantially uniform thickness, forming while the sheet is still in a soft condition intersecting grooves in succeeding portions of one face of said sheet, at least one of the grooves being continuous and extending thereacross substantially from edge to edge thereof, simultaneously forming registering grooves on the opposite face of the sheet, continuously subjecting successive portions of said sheet to a cooling blast immediately after the formation of said grooves, and severing the sheet along the grooves after chilling.

4. A process for the production of sheets of tempered glass from molten glass comprising, forming molten glass into a sheet of substantially uniform thickness, having at least one continuous groove therein extending thereacross substantially from edge to edge, subjecting all portions of said grooved sheet to a cooling blast immediately after the formation thereof, and severing the sheet along the groove after chilling.

5. A continuous process for the production of sheets of tempered glass from molten glass comprising, continuously forming molten glass into a sheet of substantially uniform thickness, forming while the sheet is still in a soft condition at least one continuous groove therein extending thereacross substantially from edge to edge, continuously subjecting successive portions of said sheet to a partial tempering, reforming said groove subsequent to the partial tempering, completing the tempering and thereafter severing the sheet along the groove after chilling.

EDOARDO FERLITO.